A. ROSENBERG.
TELEPHONE RECEIVER.
APPLICATION FILED JAN. 24, 1912.

1,096,127.

Patented May 12, 1914.

2 SHEETS—SHEET 1.

WITNESSES
G. V. Rasmussen
Louis Alexander

INVENTOR
Augustus Rosenberg
BY
Bresen & Knauth
ATTORNEYS

A. ROSENBERG.
TELEPHONE RECEIVER.
APPLICATION FILED JAN. 24, 1912.
1,096,127.
Patented May 12, 1914.
2 SHEETS—SHEET 2.
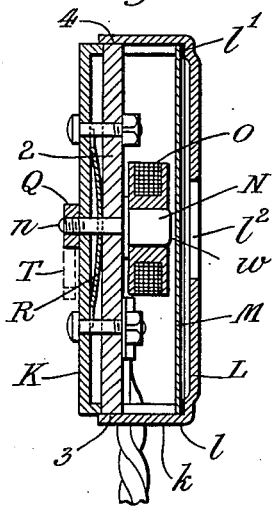
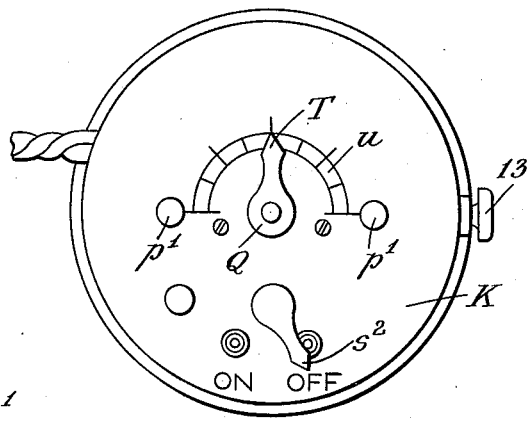
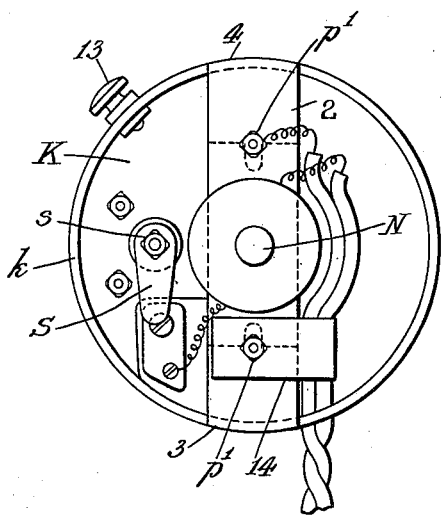
WITNESSES
G. V. Rasmussen
Louis Alexander
INVENTOR
Augustus Rosenberg
BY
Bonesin & Knauth
ATTORNEYS

UNITED STATES PATENT OFFICE.

AUGUSTUS ROSENBERG, OF LONDON, ENGLAND.

TELEPHONE-RECEIVER.

1,096,127.           Specification of Letters Patent.      Patented May 12, 1914.

Application filed January 24, 1912. Serial No. 673,222.

*To all whom it may concern:*

Be it known that I, AUGUSTUS ROSENBERG, a subject of the King of Great Britain, and resident of 259 High Holborn, London, W. C., England, engineer, have invented certain new and useful Improvements in Telephone-Receivers, of which the following is a specification.

This invention relates to watch-form telephone receivers of the electro-magnetic polarized type more especially designed for the use of persons of imperfect hearing, and has for its object on the one hand to provide a receiver whose sound-magnifying powers may, with the greatest convenience, be varied by each individual to suit his requirements between limits very much greater than those of similar apparatus as heretofore constructed, and on the other hand to reduce to a minimum the dimensions, weight, and cost of the apparatus.

For the purpose of the invention, movement of the magnetic pole-piece or pole-pieces toward and from the vibratory diaphragm is permitted with a view to enabling the width of the air gap to be varied at will, and according to the present invention the means employed for producing such movement consist in the combination of a spring tending to move the pole-piece or pole-pieces in one direction or the other, a manually rotatable member carrying a pointer movable over a scale on the outside of the casing, and screw-mechanism operable by said member for transmitting to the pole-piece or pole-pieces movement in a direction contrary to that produced by the spring.

The invention will be described with reference to the accompanying drawings wherein—

Figure 1:
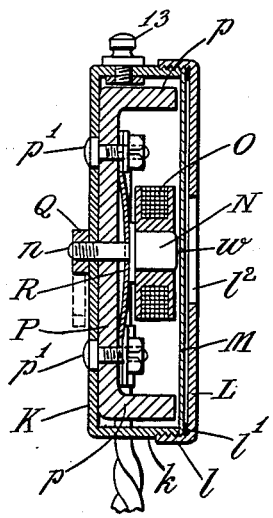
Figure 2:
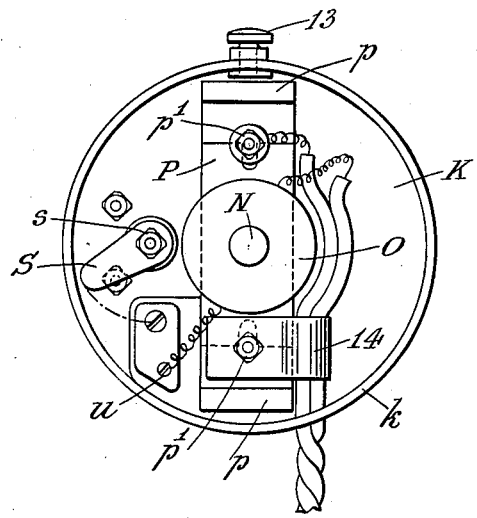
Figure 3:
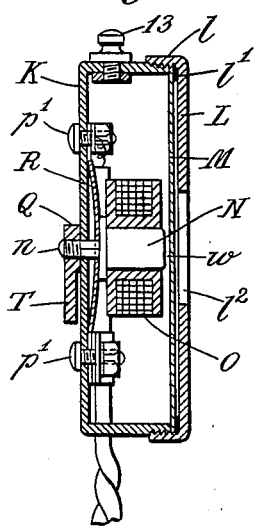
Figure 4:
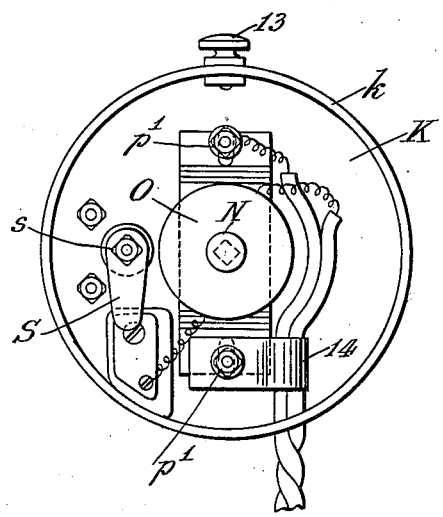

Figure 1 is a vertical section and Fig. 2 a face view with the cover removed showing a typical form of receiver wherein the casing is of conductive material and wherein the core of the receiver coil is alone adjustable relatively to the diaphragm. Figs. 3 and 4 are similar views corresponding respectively to Figs. 1 and 2, wherein the casing is of permanently magnetized metal and constitutes the body of the permanent magnet. Figs. 5 and 6 are similar views corresponding respectively to Figs. 1 and 2, wherein the receiver coil core is rigidly mounted on the permanent magnet and wherein the core and the magnet are adjustable as a whole relatively to the diaphragm. Fig. 7 is a rear elevation of the receiver shown in Figs. 3 and 4.

Similar reference symbols indicate corresponding parts throughout the drawings.

The polarized magnetic receiver is either provided with a magnet whose body-portion is of permanently magnetized metal as shown in Figs. 1 and 2 and 5 and 6, or the casing of the receiver may be of permanently magnetized metal, as shown in Figs. 3 and 4. The casing of the receiver consists of two parts, namely a foundation-disk K (forming the back of the casing) which has a substantially cylindrical marginal flange $k$, and a covering disk L having a similar flange $l$ which fits over and is secured to the flange $k$ in any suitable manner. The diaphragm M is clamped between the edge of the flange $k$ and a peripheral corrugation or beading, such as indicated at $l^1$, encircling the margin of the covering disk L, whose main or central portion is thus offset from the diaphragm M so as to afford the latter ample space and freedom to vibrate, while the covering disk has a central aperture $l^2$ (or a number of perforations) to permit of the aerial sound-waves set up by the vibration of the diaphragm M to reach the ear of the user.

In cases where (as in Figs. 3 and 4) the foundation-disk K is of magnetizable metal no magnet proper is employed but the casing itself may either be permanently magnetized and form part of the electric circuit, or (as in the example illustrated in the figures just referred to) may be of magnetizable (or magnetized) metal so as to be adapted to constitute the body-portion of the electro-magnet. In the latter case, the annular flange $k$ forms one pole-piece of the magnet, while the other pole-piece is constituted by a permanently magnetized stud N carrying (or passing through) the electro-magnetic winding O and so mounted concentrically with the disk K as to be adjustable toward and from the diaphragm M for the purpose of varying the width of the polar air-gap $w$.

In cases where (as in Figs. 1 and 2) the foundation-disk K is of non-magnetic material, the magnet, which is then inclosed within the casing, may be of any convenient character or construction provided that at least one of its pole-pieces is capable of adjustment toward and from the central portion of the diaphragm M. In the example illustrated in Figs. 1 and 2 the body of the magnet is constituted by an iron bar P extending diametrically of the casing and having its ends $p$ forwardly bent so as to approach the diaphragm M; these ends $p$ both constituting poles of the same sign while the pole of opposite sign is constituted by a permanently magnetized iron stud N carrying (or passing through) the bar P and winding O and so mounted concentrically with the disk K as to be adjustable toward and from the diaphragm M for the purpose of varying the width of the polar air-gap $w$.

In the example illustrated in Figs. 5 and 6 the body of the magnet is constituted by an iron bar 2 each of whose extremities passes through the flange $k$ of the casing as at 3, 4. The casing K should preferably be of non-magnetizable material while the core L and flange $l$, the latter of which is in contact with the outer pole pieces of the magnet 2, should be of magnetizable material so as to complete the magnetic circuit. The adjustment of the pole-piece N is, in all cases, effected by means of a nut Q screwing on the threaded outer end $n$ of the stud N which passes through an aperture in the disk K, the nut Q serving to draw the stud rearward in opposition to the stress of a spring R, which is shown in Fig. 3 as interposed between the disk K and a shoulder on the stud, in Fig. 1 as interposed between the magnet-bar P and the coil, and in Fig. 5 as interposed between the disk K and the magnet 2. In all cases the receiver coil moves as one with the stud it is intended to magnetize. In each case the stud N is shown as prevented from rotating along with the nut Q by being provided with a square or D-shaped portion (Fig. 1) which engages in a correspondingly shaped hole in the bar P (the latter being held against rotation by bolts or screws $p^1$), and in Fig. 3 engages in a correspondingly shaped hole in the spring R which in turn is held on to the foundation-disk K by means of bolts or screws $p^1$. The nut Q carries a pointer T which moves (with the rotation of the nut) over a scale-marked arc $v$ (Fig. 7) on the outer face of the disk K so as to enable a suitable adjustment of the width of the polar air-gap $w$, when once determined, to be readily recovered after accidental disturbance. The ready adjustability of the air-gap $w$ also renders it possible for receivers of identical construction to be made to serve for users having widely different requirements, so that the expense attendant upon making receivers to suit the special requirements of particular users may be entirely (or almost entirely) obviated.

It will be observed that in the forms of receiver illustrated, the magnetic circuit is closed in such manner as to expose the diaphragm M to the attraction of a relatively powerful field, the instrument being thereby rendered very sensitive. In the example illustrated in Fig. 3, wherein the foundation-disk K is understood to form the body of the magnet, this result is independent of whether the cover L is of magnetizable material or not.

In order to obviate waste of current when (for example) the apparatus is not in use, a switch S is provided within the casing of the receiver, whereby to enable the electric circuit to be broken at will. This switch consists of a spring blade pivoted to the foundation-disk K as at $s$ and provided with a handle constituted (for example) by the externally-presented head of the pivot-pin $s^2$. One end of the winding O of the electro-magnet is in each case shown as connected to a terminal $u$ which is fixed to the foundation-disk K in position to establish contact with the switch S when the latter is in the operative position (the inoperative or open position being shown in Fig. 2). The opposite end of the winding O is connected to one of the members of the flexible conductor, both of whose members are led through the wall of the casing of the receiver, preferably at or near its lower side, as indicated. The other member of the conductor is connected to the pivot $s$ of switch S through the medium of the disk K where, as in Fig. 4, this disk is of metal. In the latter case the terminal $u$ would, of course, require to be insulated from the disk K. The receiver may be provided at its upper extremity with an extension 13 adapted to be secured to a band (not shown) placed around the user's head and serving to hold the receiver in position over the ear or ears of the afflicted person, thus allowing them the full use of their hands when using the apparatus.

In the drawings each receiver is provided with a single movable stud N and coil. If desired, more than one stud and coil may be employed, in which case the nut Q would be secured to the stems $n$ of one of the studs N and means (i. e. gearing) would be provided for concurrently varying to an equal amount the air-gap between each stud and the diaphragm.

As will be seen in Figs. 2, 4 and 6, the incoming wires may conveniently be held within the casing by means of a clamp 14 secured to the casing by means of one of the bolts $p^1$.

It will be observed that all the elements comprised in the apparatus are of the simplest character and construction, and that the foundation and covering disks constituting the casing of the receiver, whether formed of metal or of non-conductive material, may be stampings, castings, or pressed-up moldings requiring little or no machining and fitting, while all the parts constituting the receiver may be assembled with the minimum of skilled labor and hence the cost of production is exceedingly small.

Claims.

1. In a telephone receiver of the watch type the combination with a casing of a magnet having radially disposed poles a central pole-piece provided with a shoulder at its lower end, a shank extending therefrom through said casing, the end of said shank being threaded, a spring under compression between said shoulder and the casing, means interacting between the spring and said shank to prevent the latter and its pole-piece from turning, a nut on the threaded end of said shank provided with a pointer and a graduated scale on the back of said receiver casing with which said pointer is adapted to coöperate.

2. In a telephone receiver of the watch type the combination with a casing composed of telescoping members of a magnet having radially disposed poles, said poles extending through one member of the casing and contacting with the outer telescoping member, a central pole-piece provided with a shoulder at its lower end, a shank extending therefrom through said radially disposed magnet and through the back of said casing, the end of the shank being threaded, a spring under compression between the casing and said magnet and the shoulder of said pole-piece, means permitting movement of said magnet and the pole-piece axially of the latter, a nut on the threaded end of said shank for adjusting said pole-piece and magnet, and a pointer connected with said nut adapted to coöperate with a graduated scale on the back of said casing to indicate the adjustment.

AUGUSTUS ROSENBERG.

Witnesses:
  GEORGE ERNEST MINTERN,
  BERTRAM BECK.